(12) United States Patent
Dhavaleswarapu et al.

(10) Patent No.: US 12,437,131 B2
(45) Date of Patent: Oct. 7, 2025

(54) METHOD AND SYSTEM FOR QUANTIFYING VEHICLE REQUIREMENT

(71) Applicant: Aptiv Technologies AG, Schaffhausen (CH)

(72) Inventors: Venkat Dheeraj Dhavaleswarapu, Wuppertal (DE); David Fernandez, Essen (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 174 days.

(21) Appl. No.: 17/988,976

(22) Filed: Nov. 17, 2022

(65) Prior Publication Data

US 2023/0177234 A1   Jun. 8, 2023

(30) Foreign Application Priority Data

Dec. 2, 2021   (EP) .................................... 21211913

(51) Int. Cl.
  *G06F 30/20*   (2020.01)
  *B60W 40/04*   (2006.01)
  *B60W 40/06*   (2012.01)

(52) U.S. Cl.
  CPC ............ *G06F 30/20* (2020.01); *B60W 40/04* (2013.01); *B60W 40/06* (2013.01)

(58) Field of Classification Search
  CPC ........ G06F 30/20; B60W 40/04; B60W 40/06
  See application file for complete search history.

(56) References Cited

U.S. PATENT DOCUMENTS

| 9,727,496 B1 * | 8/2017 | Parundekar | ........... G06F 13/126 |
| 2015/0298689 A1 | 10/2015 | Schwartz et al. | |
| 2019/0155291 A1 * | 5/2019 | Heit | ..................... G05D 1/0221 |

OTHER PUBLICATIONS

Thorsten Koch, "Towards Scenario-Based Security Requirements Engineering for Cyber-Physical Systems", Springer Nature Switzerland AG, 2018, pp. 1-11.
P. Sampath, et al., "Evolving Specification Formally", IEEE 19th International Requirements Engineering Conference , 2011, pp. 1-10.
Extended European Search Report issued by the European Patent Office in connection with International Application No. 21211913.5, dated Jun. 1, 2022.

\* cited by examiner

*Primary Examiner* — Aaron L Troost
(74) *Attorney, Agent, or Firm* — Harness, Dickey & Pierce, P.L.C.

(57) ABSTRACT

A method and system for quantifying vehicle requirements includes providing a requirement quantification tool comprising a simulator, a memory storing information characterizing a first traffic use case on a first abstraction level and a generation function to generate a condition value for the vehicle requirement from an observed parameter extracted from results of a simulation related to said first traffic use case. By the requirement quantification tool: acquiring characterization information characterizing at least one second traffic use case associated with the first traffic use case, on a second abstraction level lower than the first abstraction level. For each second traffic use case, the simulator is operated to run a simulation, a value for the observed parameter is extracted from the simulation results, and a condition value for the vehicle requirement is generated from the extracted value of the observed parameter by executing the stored generation function.

15 Claims, 2 Drawing Sheets

FIG. 1
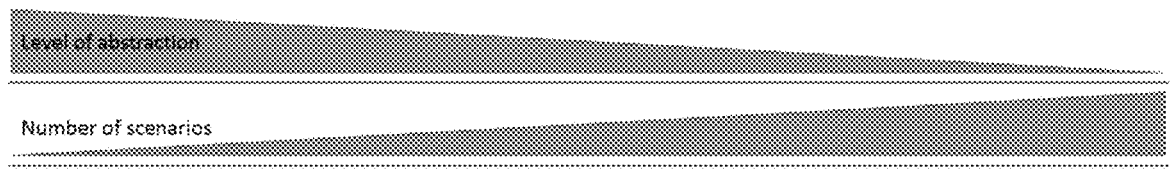
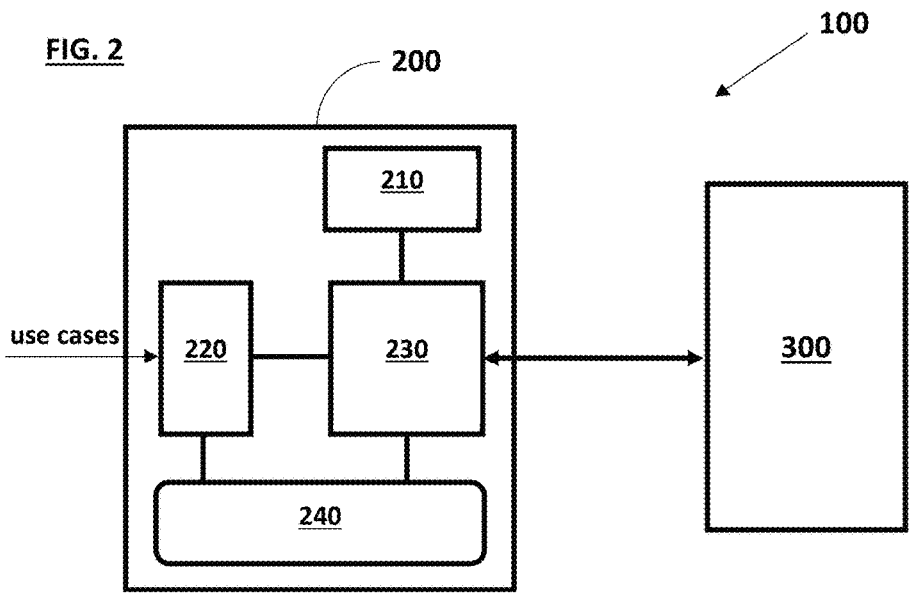
FIG. 2

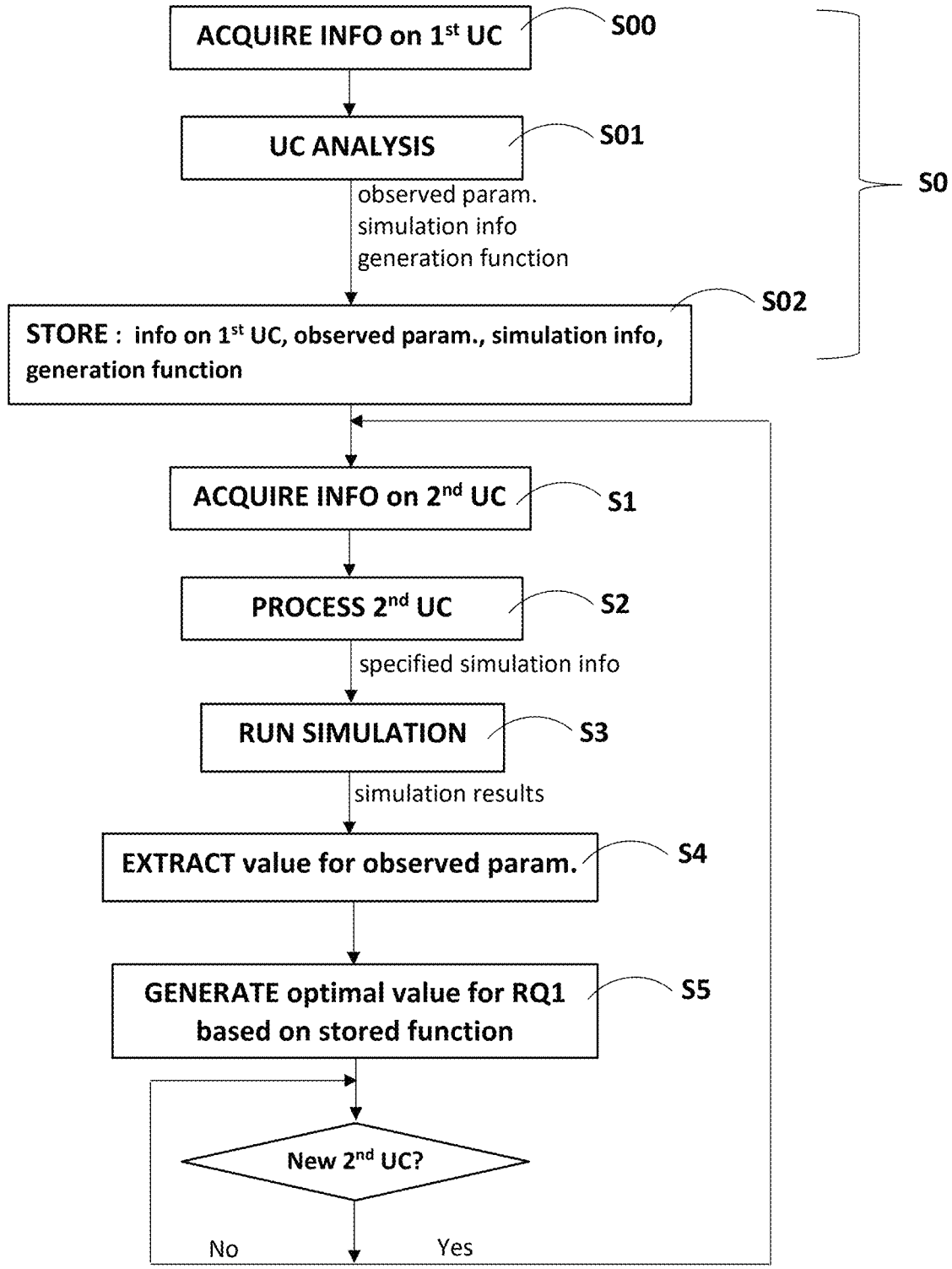

METHOD AND SYSTEM FOR QUANTIFYING VEHICLE REQUIREMENT

CROSS-REFERENCE TO RELATED APPLICATION

This application claims the benefit of European patent application serial number EP 21211913.5 filed on Dec. 2, 2021. The entire contents of which are hereby incorporated by reference herein.

TECHNICAL FIELD

The present disclosure relates to a method and a simulation tool for quantifying vehicle requirements, in other words technical parameters related to a vehicle, from use cases. Such a tool may be used for example in the development of automated vehicles or ADAS (Advanced driver-assistance systems) systems.

BACKGROUND

In automotive industry, in the field of automated vehicles and ADAS systems, vehicle level requirements, for example a distance sensing range for a sensor in the vehicle, may be developed using a use case or scenario-based approach, by deriving values for vehicle level requirements from use cases, also termed as traffic use cases or scenarios. Original Equipment Manufacturers, OEMs, edit use cases or scenarios catalogues for analyzing and testing automated vehicles or ADAS systems. The traffic use cases may also be used to quantify vehicle level requirements, in other words to determine condition values of technical parameters for components or systems of the vehicle.

The description of a use case may include information related to many elements, such as the roadway, for example the road layout and/or geometry, condition of the road surface, traffic guidance infrastructure, e.g., traffic signs, barriers, markings, road users, objects, environmental conditions such as weather and daytime, etc., and information related to a target vehicle, like an ego vehicle, including an expected behaviour of the vehicle comprising the vehicle's actions and the interaction of the vehicle with other road users and objects. The document PAS 1883:2020 "Operational Design Domain taxonomy for an automated driving system ADS—Specification" edited by BSI Standards Limited 2020—ISBN 978 0 539 06735 4—provides requirements for the minimum hierarchical taxonomy for specifying an Operational Design Domain ODD to enable the safe deployment of an automated driving system ADS. The ODD comprises the static and dynamic attributes within which an ADS is designed to function safely. This document enumerates everything that may be considered as relevant to describe a use case for automated vehicle trials and development testing.

The descriptions of use cases may have different levels of abstraction, in other words different levels of detail. For example, one approach that has been established for describing scenarios or use cases is classifying scenarios according to three categories:
functional scenarios, for high-level of abstraction,
logical scenarios, for medium level of abstraction, and
concrete scenarios, for low-level of abstraction.
FIG. 1 shows illustrative examples of three related functional, logical, and concrete traffic scenarios or use cases from Pegasus Project, 2018.

Functional use cases have the highest level of abstraction. On the highest level of abstraction, a use case outlines the core concept of the traffic scenario including a basic description of the ego vehicle's actions, the interactions of the ego vehicle with other road users and objects, a roadway geometry, and other elements/parameters of the scenario such as environmental conditions. The use cases are expressed in natural language.

Logical use cases have a medium level of abstraction. A logical use case may be considered as a particular case, or a sub-case, of a functional use case, that includes more detailed information. On a logical level, the elements or parameters of the use case, identified in the functional use case, are specified more precisely by selecting value ranges or probability distributions for each element/parameter.

Concrete use cases have the lowest level of abstractions. They are derived from a logical use case, by picking specific values within the ranges of values defined on the logical level, for each element/parameter. An infinite number of concrete use cases may be derived from one functional use case.

From the functional scenario on the left towards the concrete scenario on the right in FIG. 1, the level of abstraction decreases, while the number of possible scenarios increases. The functional scenario includes a plurality of logical scenarios, and each logical scenario includes many concrete scenarios.

The vehicle level requirements or technical parameters, such as distance sensing range of a sensor, may generally be derived from use cases. For that purpose, an engineer's task is to analyze use cases to identify:
which vehicle level requirement(s) may be derived from each use case, and
which parameter(s) from said use case is/are relevant or appropriate for determining the identified requirement(s), for example a distance sensing range may be determined from a stopping distance of the vehicle.

A use case may be used to quantify a vehicle requirement, in other words to determine a condition value of the vehicle requirement. A condition value represents a value required for the vehicle requirement to execute correctly the use case. If the condition value is satisfied by the vehicle requirement, the expected behaviour of the vehicle as specified in the use case is fulfilled. If the condition value is not satisfied by the vehicle requirement, the expected behaviour of the vehicle as specified in the use case is not fulfilled. To determine a condition value for a vehicle requirement from a use case, a concrete value for an identified relevant use case parameter is computed. There are different approaches for computing a concrete value for a use case parameter, as explained below.

A first approach is to identify and use a mathematical model for computing the value of the parameter, based on an expert knowledge. For example, the stopping distance of the vehicle is the result of a function taking as inputs an initial speed, a deceleration, and a friction coefficient of the road. With this first approach, some aspects of the scene are likely to be overlooked, since modeling all constraints is a tedious task and therefore simple models with less constraints are used. Such an approach produces poor requirements.

A second approach uses a computer-implemented virtual simulation tool that allows to run complex kinematic models to generate more accurate concrete values of parameters and consequently more accurate vehicle requirements. However, such an approach requires more effort and time to build test cases in the virtual simulation tool and determine pass/fail criteria.

A third approach uses a field simulation using a test vehicle, which is powerful but more complex and time consuming. The field simulation-based approaches are mostly used to validate requirements at a later stage of development on software under the loop, but not to check the feasibility of specifications and generate vehicle level requirements at an early stage of the development.

The increasing complexity of automated vehicles and ADAS systems requires to continuously revise boundary conditions of parameters or elements from use cases, to be able to match with capabilities of the available technology. As a result, the process of requirement specification and elicitation becomes more and more complex and time consuming.

Therefore, there is a need to improve the situation. More precisely, there is a need to facilitate the generation and/or verification of vehicle level requirements at an early stage of development using a use case approach.

SUMMARY

The present disclosure concerns a computer-implemented method for determining a condition value for a vehicle requirement, or vehicle technical parameter, related to a component or system in a vehicle, including: providing a requirement quantification tool comprising a simulator, a memory storing information characterizing at least one first traffic use case on a first abstraction level and a generation function configured to generate, when executed, a condition value for the vehicle requirement from an observed parameter extracted from results of a simulation related to said first traffic use case performed by the simulator; and
  performing by the requirement quantification tool the steps of:
    acquiring characterization information characterizing at least one second traffic use case on a second abstraction level, which is lower than the first abstraction level, each second traffic use case associated with the first traffic use case, and
    for each second traffic use case, performing the steps of operating the simulator to run a simulation related to said second traffic use case, extracting a value for the observed parameter from the simulation results, and generating a condition value for the vehicle requirement from the extracted value of the observed parameter by executing the stored generation function.

The requirement quantification tool stores in memory information characterizing a first traffic use case on a first level of abstraction, for example a logical use case, and a generation function allowing to obtain a condition value for a vehicle requirement from a value of an observed parameter extracted from results of a simulation related to the first use case. The tool can be used to easily generate condition values for the vehicle requirement for any other second use case on a second level of abstraction, lower than the first level of abstraction, that is associated to the first use case, based on the generation function. For example, in case that the first traffic use case is a logical use case, the tool may automatically generate condition values for the vehicle requirement for any concrete use case belonging to this logical use case. As a result, it is easier to determine concrete values for technical parameters of components or systems of the vehicle for many different concrete use cases. For example, a change on a boundary condition of the use case may yield a new condition value for the vehicle requirement. By associating in memory a first traffic use case and the generation function, that makes a link between a vehicle requirement and an observed parameter to be extracted from simulation results, efforts for analyzing and processing the second use case(s) are importantly reduced.

In an embodiment, the memory further comprises first set-up information for operating the simulator to run a simulation related to said first traffic use case, and the requirement quantification tool is configured to perform a step of processing the characterization information of each second traffic use case to specify second set-up information for operating the simulator to run the simulation related to said second traffic use case, based on the stored first set-up information.

The use of the simulator allows to run simulations based on complex mathematical models that generate accurate results.

In an embodiment, for each second traffic use case, the simulator runs a test case that is different from the second traffic use case, whereby one or more elements of the characterization information of the second traffic use case are ignored in the test case. As a result, the simulation is easier to implement.

Other features of the present disclosure are defined in the appended claims.

BRIEF DESCRIPTION OF THE DRAWINGS

Other features, purposes and advantages of the disclosure will become more explicit by means of reading the detailed statement of the non-restrictive embodiments made with reference to the accompanying drawings.

FIG. 1 shows illustrative examples of functional, logical, and concrete traffic scenarios or use cases.

FIG. 2 shows a system for quantification of vehicle level requirements, according to an embodiment.

FIG. 3 shows a flowchart of a computer-implemented method for determining a condition value for a vehicle level requirement or technical parameters in a vehicle, according to an embodiment.

DETAILED DESCRIPTION

The present disclosure concerns a system 100 for quantifying vehicle level requirements, in other words for determining condition values for technical parameters related to the vehicle, from traffic use cases. A role of the system 100 is to facilitate the determination of condition values for vehicle level requirements, or technical parameters of the vehicle. The requirements or technical parameters may be related to components or systems in the vehicle, such as components of an autonomous vehicle or ADAS systems.

A traffic use case, also termed as "use case", or traffic scenario, also termed as "scenario", is a description of a traffic situation including different parameters for describing an expected behaviour of a vehicle, such as an "ego vehicle", and other elements including for example:
  the road, described by a roadway layout/geometry, condition of the road surface,
  traffic guidance infrastructure, including traffic signs, barriers, markings, etc . . . ,
  other road users, objects, environmental conditions such as weather and daytime, etc . . . , The expected behaviour of the vehicle may include the expected vehicle's actions and/or the expected interaction of the vehicle with other road users and objects.

The descriptions of traffic use cases may have different abstraction levels: the higher the abstraction level, the less details in the description of the use case. For example, it is known to classify the traffic use cases into three categories: functional, logical, and concrete use cases or scenarios. Each functional use case covers or includes a plurality of different logical use cases, and each logical use cases covers or includes a plurality of different concrete use cases.

A functional traffic use case outlines a core concept of the use case and includes a basic description of the expected behaviour of the vehicle and of other elements such as the road, the traffic guidance infrastructure, other road users and objects, the environmental conditions.

A logical use case includes a list of parameters identified in the associated functional traffic use case and value ranges or probability distributions for the identified parameters.

A concrete use case is associated with a logical use case and describes specific values for the identified parameters.

An illustrative example of a functional traffic use case (or scenario), logical use case and concrete use case is shown in FIG. 1. In another illustrative and non-limitative example, a functional traffic use case describes an automated emergency braking 'AEB' function for a vehicle. A logical traffic use case "A" associated with the AEB functional traffic use case describes a scenario of automated emergency braking of a vehicle before collision with a front stopped vehicle in a straight road lane. Another logical traffic use case "B" associated with the AEB functional traffic use case describes a scenario of automated emergency braking of a vehicle before collision with a front stopped vehicle in a curved road lane. A concrete traffic use case associated with the logical traffic use case "A" or "B" may include specific values for the curve radius of the road, the vehicle speed, the distance between the vehicle and the front stopped vehicle, etc . . . , The classification of the use cases into functional, logical, and concrete levels, as illustrated in FIG. 1, is only an example of classification. Any other type of classification based on the abstraction level of the description of the use case could be used in the present disclosure.

A use case may be used to quantify one or more vehicle requirements, in other words to determine a condition value for the vehicle requirement(s). A condition value for a vehicle requirement represents a value that the vehicle requirement must satisfy so that the use case can be correctly executed by the vehicle. The condition value may be a limit or threshold value. If the condition value is satisfied by the vehicle requirement, the expected behaviour of the vehicle in the use case is fulfilled. If the condition value is not satisfied by the vehicle requirement, the expected behaviour of the vehicle in the use case is not fulfilled.

FIG. 2 illustrates the system 100 for quantifying vehicle level requirements, according to an embodiment.

The system 100 includes a requirement quantification tool 200 and a simulator 300. The simulator 300 may be internal, included in the tool 200, or external to the tool 200.

In an embodiment, the requirement quantification tool 200 is responsible for generating condition values for one or more specific vehicle level requirements, referenced as RQ1, for example a distance sensing range of a sensor from traffic use cases.

The requirement quantification tool 200 includes a memory 210, an acquisition module 220, an generation module 230, and a control unit 240.

The memory 210 stores characterization or description information characterizing or describing a first traffic use case on a first abstraction level, first set-up information for simulation, and a generation function.

The information characterizing the first traffic use case includes a plurality of parameters related to an expected behavior of a vehicle, a traffic scenario, describing a road geometry, a traffic guidance infrastructure, other road users and objects, environment conditions, etc., and optionally an event within the traffic scenario, for example a tree falling on the road. The first abstraction level is for example the logical level. In that case, the parameters of the first traffic use case include parameters identified in a functional use case including the first use case and value ranges for each of the parameters. In a variant, the first abstraction level is higher than the logical level, and only includes the identified parameters of the associated functional use case, to which the logical first use case belongs, without the associated value ranges.

The first set-up information for simulation includes information required as set-up for the simulator 300 to run a simulation related to the first traffic use case. In an embodiment, the first set-up information for simulation includes information related to a predefined set-up for the simulator 300 allowing to simulate a test case. The test case is derived from the first traffic use case but may be different from the first traffic use case. More precisely, one or more parameters of the first traffic use case, in other words one or more elements of the characterization information of the first traffic use case, may be ignored in the test case, in so far these parameters are not relevant for the determination of a condition value for the vehicle level requirement (technical parameter).

The acquisition module 220 is operable for acquiring characterization information characterizing one or more second traffic use cases on a second abstraction level, lower than the first abstraction level, in other words more detailed than the first abstraction level. The acquired second traffic use cases is associated with the first traffic use case stored in memory 210. The acquired second traffic use cases on the second abstraction level are different particular use cases falling within the scope of the first traffic use case on the first abstraction level. In an embodiment, the second abstraction level is the concrete level. In other words, the second traffic use cases are concrete traffic use cases. The acquisition module 220 may include hardware and/or software.

The generation function stored in the memory 210 is configured to generate, when executed, a condition value for the specific vehicle level requirement from at least one pre-identified observed parameter to be extracted from results of simulation performed for a second traffic use case on second abstraction level. The generation function is a relationship or a formula between the identified observed parameter(s) extracted from the simulation results and the condition value of the specific vehicle requirement or technical parameter.

The generation module 230 has the role of automating the determination, or generation, of a condition value for the specific vehicle level requirement or technical parameter from each second traffic use case. More precisely, the generation module 230 is responsible for processing the characterization information of each second traffic use case to specify second set-up information for simulation required for the simulator 300 and, for each second traffic use case, operating the simulator 300 to run a simulation based on the specified second set-up information for simulation, extracting a value for the pre-identified observed parameter(s) from the simulation results, and generating a condition value for the vehicle level requirement from the extracted value of the observed parameter(s) by executing the stored generation function. The generation module 230 may be software running on the control unit 240 and a mix of software and hardware.

The control unit 240 may be a processor. It is responsible for controlling the operation of the tool 200.

In another embodiment, the tool 200 is operable for determining condition values for a plurality of vehicle requirements based on a plurality of different first traffic use cases on the first abstraction level, for example a plurality of logical use cases. The different first traffic use cases may be associated with a same, common, third traffic use case on a third abstraction level higher than the first abstraction level, for example the same functional use case. In that case, the tool 200 allows to determine condition values for a plurality of specific vehicle level requirements RQ1, RQ2, . . . , each first traffic use case being appropriate to quantify one or more specific vehicle requirements. In such an embodiment, the requirement quantification tool 200 is qualified for processing second use cases, for example concrete use cases, associated with any of the plurality of first use cases, for example logical use cases, within the same third traffic use case, for example within the same functional traffic use case. In this embodiment, the memory 210 stores, for each of the plurality of first traffic use cases, characterization information characterizing said first traffic use case, specific first set-up information for simulation, and a specific generation function for generating a condition value for the specific vehicle requirement from an observed parameter to be extracted from results of a simulation related to said first traffic use case. The memory 210 may also store information characterizing the third traffic use case, for example a functional traffic use case.

The tool 200 may further include an assignment module, not represented, operable for analyzing each second traffic use case acquired by the acquisition module 220, selecting one first traffic use case including said second traffic use case, and assigning the second traffic use case to the selected first traffic use case. Then, the generation module 230 may use the appropriate corresponding first set-up information for simulation and generation function, associated with the selected first use case in memory 210, to perform a simulation and generate a condition value for one or more specific vehicle requirements.

The system 100 may include a plurality of different requirement quantification tools, each tool being developed and adapted for one first traffic use case or for a plurality of first traffic use cases.

A computer-implemented method for determining a condition value for a specific requirement RQ1, or technical parameter, in a vehicle is illustrated in FIG. 3 and will now be described, according to an embodiment.

The method includes preliminary steps to configure the requirement quantification tool 200. The preliminary steps are performed to store the first traffic use case, the first set-up information for simulation and the generation function in the memory 210, before a first use of the tool 200.

In a first preliminary step S00, the characterization information characterizing a first traffic use case on the first abstraction level is acquired. For example, the first traffic use case is a logical use case or a logical use case without value ranges. Then, in a second preliminary step S01, an analysis of the first traffic use case is performed. In the use case analysis, one specific vehicle level requirement RQ1 that is relevant for said first traffic use case is identified. Optionally, more than one specific vehicle level requirements RQ1, RQ2, . . . are identified. The identification consists in determining, based on the characteristics or parameters of the first traffic use case, which requirement of the vehicle, or which requirement of a component or system in the vehicle, may be precisely quantified from this first traffic use case. In other words, it is determined for which requirement it is appropriate to determine a condition value from the first traffic use case.

Let's consider two slightly different first traffic use cases A and B:
in the first traffic use case A, an ego vehicle moves in a straight lane on a highway and approaches a front vehicle stopped in the same lane,
in the first traffic use case B, an ego vehicle moves in a curved lane on a highway and approaches a front vehicle stopped in the same lane.

In the two first use cases A and B, an expected behaviour of the ego vehicle is to detect the stopped vehicle in the same lane with a sensor S, then to brake and stop in order to avoid collision with the stopped vehicle. The two use cases A and B are appropriate to determine condition values for requirements, or technical parameters, related to the sensor S of the ego vehicle. The requirements of the sensor S include a distance sensing range and a field of view sensing range. The distance sensing range may be defined as a distance region along a straight line passing through the sensor S from the sensor S to a maximal point of the line, in other words at a maximal distance from the sensor S, where every object that takes place in this region may be detected by the sensor S. The range of field of view may be defined by an angular region centered on the sensor S and delimited by a maximal solid angle, where every object that takes place in this region may be detected by the sensor S. The use case A, describing a straight lane, is more appropriate to determine a condition value for the maximal distance of the distance sensing range. The use case B, describing a curved lane, is more appropriate to determine a condition value of the maximal solid angle for the field of view of the sensor S. In the use case analysis, the identification allows to determine one specific vehicle level requirement; possibly several specific vehicle level requirements, depending on the use case that may be appropriately, accurately and efficiently quantified from said use case.

In the use case analysis S01, an observed parameter to be extracted from simulation results is also identified. More precisely, in use case analysis, it is determined how the identified technical parameter or requirement of the vehicle RQ1 may be obtained from simulation results: from which observed parameter extracted from the simulation results the technical parameter RQ1 may be derived and what is the relationship between the extracted parameter and the technical parameter. The identified relationship corresponds to the generation function, or formula, stored in memory 210.

In the illustrative example of first traffic use case A, the identified requirement being the distance sensing range, or maximal sensing distance, of the sensor S, the observed parameter to be extracted from the simulation results is the stopping distance of the ego vehicle and the relation between the extracted parameter and the vehicle level technical parameter or requirement is distance sensing range obtained as follows:

$$\text{Maximal sensing distance} = \text{stopping distance} + \text{safety distance} \qquad (1)$$

where
safety distance may be a few meters, for example 2 or 3 meters, in case that it is expected that the ego vehicle will stop at a safety distance from the stopped vehicle.

In addition, in the use case analysis, a test case based on the first traffic use case is created and first set-up information for simulation of the test case is determined. As previously indicated, the test case may be identical or similar to the first traffic use case, or it may be different, one or more parameters of the first use case, that are not relevant for producing the identified observed parameter to be extracted from the simulation results, being ignored in the test case. The first set-up information for simulation includes the necessary parameters for setting up the simulator to simulate the test case.

Then, in a preliminary step S02, the observed parameter, the first set-up information for simulation and the generation function, identified in the use case analysis S01, are stored in memory 210 and assigned in memory to the information describing the first traffic use.

Typically, the step S01 is mentally performed by a person, for example an engineer. Such a mental step contributes to producing the technical effect of more accurately and efficiently determining condition values for the vehicle requirements serving a technical purpose of improving the determination of condition values for vehicle requirements.

After configuration of the requirement quantification tool 200, the method includes a process of automatically determining condition values for the specific vehicle level requirement from use cases, described below according to an embodiment.

In an acquisition step S1, characterization information describing a second traffic use case is acquired by the acquisition module 220. The characterization information of the second traffic use case may be acquired from a use case catalogue. The use case catalogue is for example provided by an OEM. The characterization information describing the second traffic use case may be manually entered in the requirement quantification tool 200 by a user with a user-machine interface of the requirement quantification tool 200. In that case, the acquisition module 220 may include a graphical user interface for manual data entry. Alternatively, the acquisition module 220 may receive and store the use case catalogue in the form of an electronic file, and then automatically extract the characterization information describing the second traffic use case from the use case catalogue. The second traffic use case is on a second abstraction level, for example a concrete use case, lower than the first abstraction level, and is associated with the first traffic use case stored in memory 210. In other words, the second traffic use case is a particular sub-case of the first traffic use case. For example, the first traffic use case stored in memory 210 is a logical use case, possibly without value ranges, and the second traffic use case is a concrete use case indicating specific values for the parameters identified in the logical use case.

Then, in a step S2, the characterization information describing the second traffic use case is processed by the generation module 230 to specify specific second set-up information for simulation for the second traffic use case, by using the first set-up information for simulation stored in memory 210 and the characteristics of the second traffic use case.

In a next step S3, under control of the generation module 230, the tool 200 transmits the specified second set-up information for simulation to the simulator 300, and operates the simulator 300 to run a simulation based on the specified second set-up information for simulation.

In a step S4, the generation module 230 of the tool 200 receives simulation results from the simulator 300, and extracts a value for the observed parameter, indicated in memory 210, from the simulation results.

Then, in a step S5, the generation module 230 generates a condition value for the vehicle level requirement RQ1 from the value of the observed parameter extracted from the simulation results in the step S4 by executing the stored generation function. For example, the tool 200 extracts the stopping distance of the vehicle from the simulation results and computes a sensing distance required for an onboard distance sensor of the vehicle, that may be the maximal sensing distance of the distance sensing range for the sensor, based on the expression (1).

The steps S1 to S5 are repeated for each second use case acquired.

The method may further include a step of storing in a database, for each second traffic use case, the characterization information describing said second traffic use case and the generated condition value for the vehicle requirement.

The present disclosure also concerns a computer program comprising instructions to cause the requirement quantification tool 200 to execute or control the execution of the steps S1 to S5 of the method previously described.

The invention claimed is:

1. A computer-implemented method for determining a condition value for a vehicle requirement related to a component or system in a vehicle, including:
    providing a requirement quantification tool comprising a simulator, a memory storing information characterizing at least one first traffic use case on a first abstraction level and a generation function configured to generate, when executed, the condition value for the vehicle requirement from an observed parameter extracted from results of a simulation related to said first traffic use case performed by the simulator;
    performing by the requirement quantification tool the steps of:
        acquiring characterization information characterizing at least one second traffic use case on a second abstraction level, lower than the first abstraction level, each second traffic use case being associated with the first traffic use case,
        for each second traffic use case, performing the steps of operating the simulator to run a simulation related to said second traffic use case, extracting a value for the observed parameter from the simulation results, and generating the condition value for the vehicle requirement from the extracted value of the observed parameter by executing the stored generation function,
    wherein the first and second traffic use cases comprise sensing a stopped vehicle with a sensor, braking and stopping to avoid a collision with the stopped vehicle; and
    wherein the condition value for the vehicle requirement represents a maximum distance sensing range or a maximum field of view sensing range of the sensor such that the vehicle stops within a safety distance of the stopped vehicle,
    the method comprising configuring the vehicle, the vehicle including the sensor having the condition value.

2. The computer-implemented method according to claim 1, wherein, the memory further comprises first set-up information for operating the simulator to run a simulation related to said first traffic use case, and wherein the requirement quantification tool is configured to perform a step of processing the characterization information of each second traffic use case to specify second set-up information for operating the simulator to run the simulation related to said second traffic use case, based on the stored first set-up information.

3. The computer-implemented method according to claim 1, wherein, for each second traffic use case, the simulator runs a test case that is different from the second traffic use case, whereby one or more elements of the characterization information of the second traffic use case are ignored in the test case.

4. The computer-implemented method according to claim 1, comprising preliminary steps of acquiring characterization information characterizing the first traffic use case, performing an analysis of said first traffic use case and, in said use case analysis, identifying the vehicle requirement that is relevant for said first traffic use case and the observed parameter to be extracted from simulation results related to said first use case, and determining a relation between said observed parameter and the condition value of the vehicle requirement to define said generation function; storing in memory the characterization information characterizing the first traffic use case, and the generation function.

5. The computer-implemented method according to claim 4, wherein the use case analysis comprises a step of creating a test case based on the first traffic use case, whereby one or more elements of the characterization information of the first traffic use case are ignored in the test case, and a step of determining first set-up information for simulation required for the simulator to run a simulation of said test case; and
storing in memory said first set-up information for simulation of the test case.

6. The computer-implemented method according to claim 1, wherein the memory stores characterization information characterizing each of a plurality of first traffic use cases associated with a same third traffic use case on a third abstraction level higher than the first abstraction level and, for each first traffic use case, a specific generation function configured to generate, when executed, a value for a specific vehicle requirement from an observed parameter extracted from results of a simulation related to said first traffic use case;
and wherein the requirement quantification tool determines values for a plurality of vehicle requirements based on the plurality of first use cases.

7. The computer-implemented method according to claim 6, wherein the third traffic use is a functional traffic use case.

8. The computer-implemented method according to claim 1, wherein said first traffic use case is a logical traffic use case and the one or more second traffic use cases are concrete use cases.

9. A system including a requirement quantification tool and a simulator, wherein the requirement quantification tool comprises:
a memory storing information related at least one first traffic use case on a first abstraction level, and a generation function configured to generate, when executed, a condition value for a vehicle requirement from an observed parameter extracted from simulation results;
one or more processors configured to acquire characterization information characterizing at least one second traffic use cases on a second abstraction level, lower than the first abstraction level, each second traffic use case being associated with the first traffic use case,
operate the simulator to run a simulation related to each second traffic use case,
extract a value for the observed parameter from the simulation results,
generate the condition value for the vehicle requirement from the extracted value of the observed parameter by executing the stored generation function,
wherein the first and second traffic use cases comprise sensing a stopped vehicle with a sensor, braking and stopping to avoid a collision with the stopped vehicle; and
wherein the condition value for the vehicle requirement represents a maximum distance sensing range or a maximum field of view sensing range of the sensor such that the vehicle stops within a safety distance of the stopped vehicle, and
configure the vehicle, the vehicle including the sensor having the condition value.

10. The system according to claim 9, wherein the memory of the requirement quantification tool stores first set-up information for the simulator to run a simulation related to the first traffic use case, and the one or more processors are further configured to process the characterization information of each second traffic use case to specify second set-up information for the simulator to run the simulation related to said second traffic use case, based on the stored first set-up information.

11. The system according to claim 9, wherein the memory of the requirement quantification tool stores first set-up information for a simulation of a test case that is different from the first traffic use case, whereby one or more elements of the characterization information of the second traffic use case are ignored in the test case.

12. The system according to claim 9, wherein
the requirement quantification tool is operable for determining condition values for a plurality of vehicle requirements based on a plurality of first use cases associated with a same third traffic use case on a third abstraction level higher than the first abstraction level, and the memory stores characterization information characterizing each of the plurality of first traffic use cases and, for each first traffic use case, a specific generation function for generating the condition value for a specific vehicle requirement from an observed parameter to be extracted from results of a simulation related to said first traffic use case.

13. The system according to claim 12, wherein the third traffic use case is a functional use case.

14. The system according to claim 9, wherein the first traffic use case stored in the requirement quantification tool is a logical traffic use case and the one or more second traffic use cases are concrete use cases.

15. A computer program comprising instructions to cause a requirement quantification tool to execute the steps of the method of claim 1 that are performed by said requirement quantification tool.

* * * * *